June 20, 1939. E. C. KOPP 2,163,095
OIL AND GAS SEPARATOR
Filed March 21, 1938 2 Sheets-Sheet 1
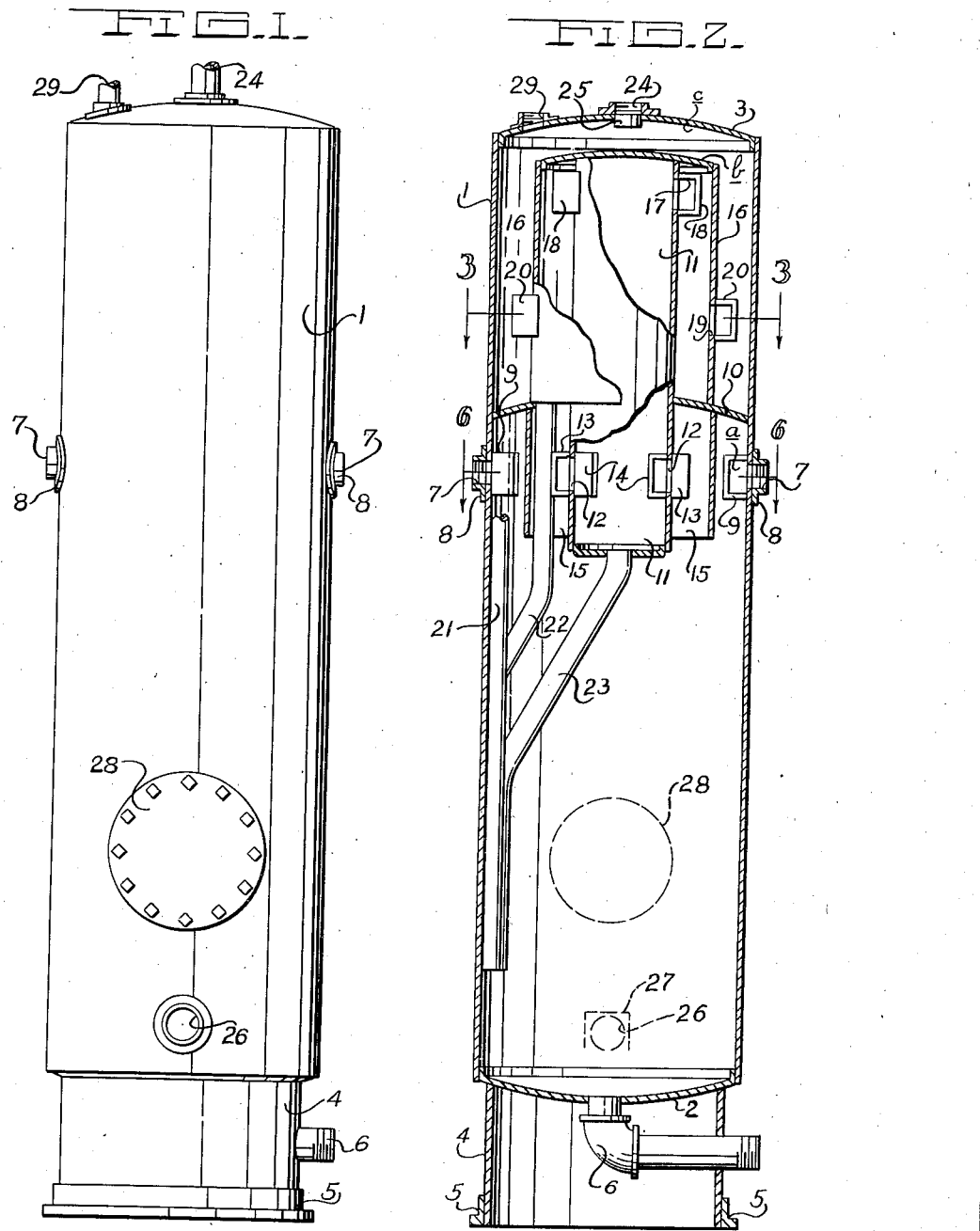
Edward C. Kopp
INVENTOR.
BY Cecil L. Wood
ATTORNEY.

June 20, 1939.　　　E. C. KOPP　　　2,163,095
OIL AND GAS SEPARATOR
Filed March 21, 1938　　2 Sheets-Sheet 2

*Edward C. Kopp*
INVENTOR.

BY Cecil L. Hood

ATTORNEY.

Patented June 20, 1939

2,163,095

UNITED STATES PATENT OFFICE 2,163,095

OIL AND GAS SEPARATOR

Edward C. Kopp, Fort Worth, Tex.

Application March 21, 1938, Serial No. 197,233

5 Claims. (Cl. 183—2.7)

This invention relates to oil and gas separators of the type usually employed in the treating of fluids such as oil, to separate the gas therefrom by introducing the influent combination into a tank, preferably arranged in an upright position, and which is provided with a series of baffles and compartments affording a means of liberating gases from the oil by a scrubbing process and its principal object resides in the provision of means whereby oil impregnated with gas can be passed, under pressure, into a cylindrical tank through louvers arranged over the intake ports having the openings extending in a clock-wise direction around the walls of the main tank so that the fluid, when introduced thereinto, will be subjected to centrifugal action and, as the liquid is circulated around and against the inner walls of the main cylinder, certain quantities thereof will pass upwardly into other cylinders or compartments through louvers arranged over the openings to direct the fluid around the inner walls of the main tank and minor compartments, meanwhile being subjected to a turbulent swirling motion whereby gases contained in the said liquid are liberated and passed upwardly through a discharge passage while the heavier liquids drain downwardly through a drain pipe and thence to storage.

Another object of the invention resides in the provision of apparatus wherein certain novel features of construction present retarding action upon the influent reducing the speed of the centrifugal or swirling action of the liquid tending to break up the particles and liberate, more rapidly, the gases contained within the influent and slow down the ultimate action of the liquid rather than to accelerate the same.

Broadly, the invention seeks to comprehend the provision of a device calculated to effectively separate the gases from the liquids and direct each constituent to storage.

While the foregoing objects are paramount, other and lesser objects will become manifest as the description proceeds taken in connection with the appended drawings wherein:

Figure 1 is a front elevational view of the invention illustrating the intake and discharge connections.

Figure 2 is a vertical cross-sectional view of the assembly illustrating the various compartments, baffles and louvers.

Figure 3:
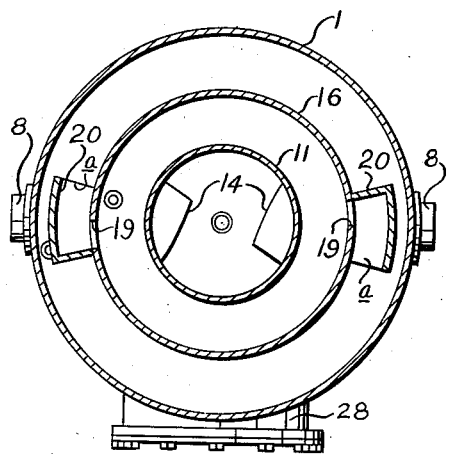
Figure 3 is a lateral cross-sectional view taken on lines 3—3 of Figure 2, showing certain of the louvers.

Accordingly, therefore, the invention comprises primarily a cylindrical tank 1 having a substantially concave bottom 2 and a preferably convex top 3 each being preferably welded in place, as illustrated particularly in Figure 2. The tank 1 is supported by a cylindrical base 4 around the lower rim of which is secured a flanged ring 5. The base 4 defines a small compartment beneath the tank to accommodate a drain outlet 6 through which bottom sediment, and other foreign matter, may be withdrawn from the tank 1.

Intake openings 7 are arranged on each side of the tank 1 near its longitudinal midsection and are approximately diametrically positional with respect to each other and each is provided with a flange 8 into which may be threaded intake pipes (not shown) which deliver the influent from the source into the tank 1.

Figure 4:
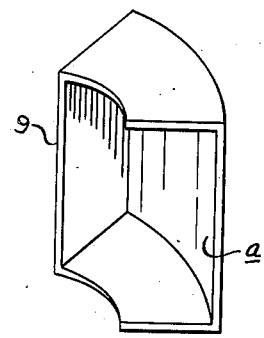
Figure 4 is a detailed view of one form of the louvers employed in the device.
Figure 5:
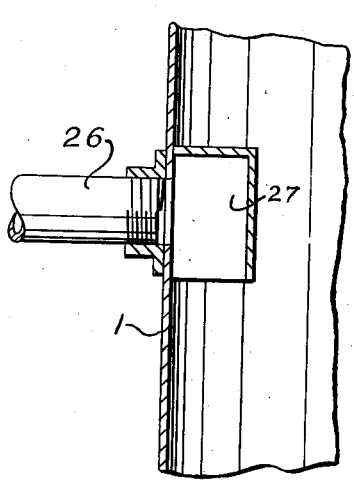
Figure 5 is a fragmentary vertical cross-section illustration of the lower front portion of the main tank showing the hooded oil outlet.

Interiorly of the tank 1 each of the openings 7 is hooded, or covered over, by louvers or deflectors 9, illustrated in detail in Figure 4, and which are substantially box-like in form having one open end $a$ to permit the passage of the fluid therethrough. The deflectors 9 are opposingly arranged, that is, their open ends $a$ are directed oppositely so as to deflect the liquid introduced through the openings 7 around the walls of the tank 1 and set up a swirling action which initiates the liberation process of the gases.

The tank is also provided with a lateral partition 10 arranged above the openings 7 whose under side is concave and defines a dome-like structure. Centrally arranged through the partition 10 is a vertically arranged cylinder 11 having both of its ends closed but having diametrically arranged openings 12 which are also hooded by louvers 13 and 14. The louvers 13 are opposingly arranged over the openings 12 exteriorly of the cylinder 11 and the louvers 14 cover the same openings interiorly of the cylinder 11. This arrangement is shown in detail in Figures 3 and 4.

It will be noted that the louvers 13 and 14 are of a different design to the louvers 9, previously described, and there is some difference in the form and structure between the louvers 13 and 14.

Reasons for such distinctions will presently become manifest.

Projecting downwardly from the partition 10 is a skirt or cylindrical baffle 15 whose lowermost end is open and which surrounds the lower end of the cylinder 11, as shown in Figure 2, concentrically with the latter and the inner walls of the tank 1. The baffle extends downwardly around the openings 12 and the louvers 13 in the cylinder 11 and thus prevents a direct flow of the liquid from the opening 7 in the tank 1 to the openings 13 and into the latter. Greater agitation of the influent is accomplished in this manner and consequently a more thorough separation of the elements.

Supported by the partition 10 another cylinder 16 is arranged to surround the cylinder 11 and its lowermost rim is secured by a weld, or the like, to the partition 10, as shown in Figure 2, while its upper end is provided with a closure b which also functions as closure for the upper end of the cylinder 11, as previously described.

Openings 17 are provided through the upper end of the cylinder 11, similar to the openings 12 in its lower end, which are also oppositely arranged and which are also provided with exterior louvers 18. The interior of the openings 17 are not covered.

On each side of the cylinder 16 openings 19 are arranged in the same longitudinal plane with the openings 17 in the cylinder 11 and such openings are hooded with exterior louvers 20. All the louvers hereinabove referred to have their open ends arranged toward a clock-wise direction, as illustrated in Figures 3 and 4, as the fluid flows through the apparatus.

The arrangement just described, and illustrated in Figure 2 defines four distinct and separate compartments through which the influent passes in the separation process. These compartments include the main tank 1 into whose lower end the influent is first introduced. Each of the three other compartments is provided with drain tubes, as shown in Figure 2, which will permit the passage of all oil back into the tank 1 when the scrubbing process is thoroughly accomplished.

The drain pipe 21 communicates with the compartment around the cylinder 16 while the pipe 22 drains the cylinder 16 and the tube 23 communicates with the lowermost end of the cylinder 11.

The louvers herein described are designed to reduce the resistance presented in the flow of the fluid through the apparatus and thus it will be seen that while the first louvers 9, as well as the louvers 18 and 20, are relatively box-like in structure and function as discharge louvers, the louvers 13 are intake or "pick up" louvers and present a lesser degree of resistance due to the curved inner surfaces thereof. The louvers 14, while these cover discharge openings 12, are designed to present even a lesser curvature of the surface to the fluid than the louvers 13. This arrangement is illustrated in Figures 3 and 6.

Figure 6:
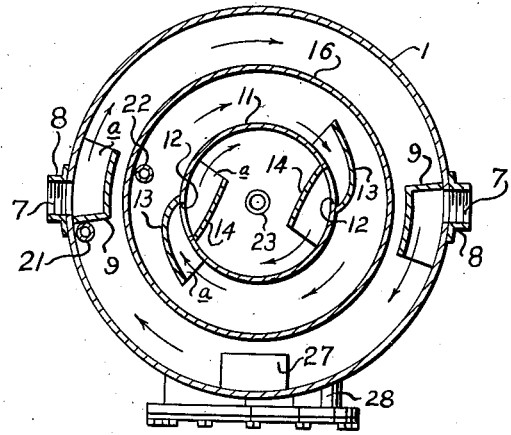
Figure 6 is a lateral cross-sectional view taken on lines 6—6 of Figure 2 illustrating the preferred form of others of the louvers employed to direct the influent in its course through the apparatus.

In operation, therefore, the influent is introduced from the well, or other source, into the tank 1 through the openings 7 against the louvers 9 which direct the fluid in a clock-wise direction, as indicated by the arrows in Figure 6, setting up a centripetal action or swirling motion.

By reason of the position of the openings 7 arranged preferably diametrically opposite to each other in the tank 1, the influent, upon entering the tank, must of necessity follow the circular walls thereof in a swirling motion, due to the louvres 9 arranged over the openings 7, and enter the inner compartments 16 and 11, respectively. Obviously, the motion to which the influent is thus subjected will be substantially retarded as the influent passes into and through each of the inner compartments, it being desirable to slow down the movement of the influent through the apparatus and increase the turbulence or agitation thereof tending to trap the oil which remains comingled with the gases through the entire process or until the final stage of the swirling action to which it is subjected has been accomplished.

Greater resistance to the movement of the influent is presented when the latter is passed through the device in centripetal motion than when the same is introduced centrally of the apparatus and caused to pass outwardly or centrifugally toward the outer walls. It has been determined that a greater scrubbing action can be accomplished by this arrangement and therefore result in a more thorough separation of the gases from the oil and entrap whatever liquid remains entrained with the gases entering the final portions of the device.

As the fluid circulates in this manner, a portion thereof passes upwardly around the lower end of the cylinder 11 and into the lower portion of the baffle 15 and is caught by the intake louvers 13 and directed into the cylinder 11 through the louvers 14. Due to the continued swirling action of the fluid the residue thereof is circulated upwardly through the cylinder 11 and outwardly therefrom through the openings 14 and the louvers 18 into the cylinder 16 from whence the remainder, with the liberated gases passes through the openings 19 and the louvers 20 into the upper portion of the tank 1, as shown in Figure 2.

As the fluid is passed from one compartment to another much of the gas is liberated and passes upwardly through the various openings and into the dome c of the tank 1 and out through the discharge opening 24 to storage (not shown). A cylindrical baffle 25 is provided to surround the under portion of the opening 24 to eliminate the passage of much liquid entrained in the flowing gases and aids in trapping the said entrained liquid and allowing the same to drain back into the tank 1.

Obviously, a goodly portion of the liquid will drain back into the tank 1 through the tube 23 from the cylinder 11 and, while the amount of liquid passing upwardly through the cylinder 11 is considered negligible, provision is made through the pipes 21 and 22 to allow the drainage of the residue of the oil from each of the other compartments after the liberation of the gases therefrom. The bulk of the liquid, however, is deposited in the bottom of the tank 1 before the gaseous constituents reach the first of the louvers 13 through 20.

As the influent is introduced into the tank 1, a larger quantity of the liquid passes downwardly and out of the container through the discharge 26 and thence to storage. The residue of the liquid passed into the other compartments of the device is subsequently drained back into the tank 1 and is comingled with the volume of fluid passing through the device.

The outlet 26 is provided with a hood 27 to allow the oil to be discharged in a less turbulent state and eliminate much of the emulsion which would otherwise result.

In pumping or flowing the influent into the apparatus direct from the well much sand, and other foreign substance, is likely to collect in the bottom of the tank 1. This can be cleaned out through the man hole 28 which is capped and sealed with a gasket. The accumulation of water may also be drained from the tank through the pipe 6 in the bottom thereof. A pop off valve (not shown) is threaded into a communication 29 arranged in the top of the tank 1.

Although the invention has been described with great particularity, it is obvious that certain changes and modifications may be resorted to from time to time by those skilled in the art and such changes and modifications as may be considered in the spirit and intent of the invention may be also considered within the scope of the appended claims.

What is claimed is:

1. In an oil and gas separator comprising a tank having a multiple of concentrically arranged vertical cylinders forming annular compartments within the said tank, the central cylinder extending below the said compartments and having its lower end closed, a top closing the upper ends of the said cylinders and spaced from the dome of the said tank providing a chamber thereabove within the dome of the said tank, a horizontal partition arranged to close the lower ends of the said compartments, louvered openings opposingly arranged in the lower end of the said central cylinder below the said partition, louvered communications above the said partition between the said central cylinder and the said compartments, a cylindrical baffle depending from the said partition around the lower end of the said central cylinder, louvered inlet openings in the said tank above the lower end of the said baffle and oil and gas outlets in the said tank.

2. In combination with an oil and gas separator comprising a main tank having a concentrical arrangement of substantially vertical cylinders in the upper part thereof forming annular compartments, the central cylinder depending below the others and having its bottom closed, a top for the said cylinders spaced from the dome of the said tank closing the upper ends of the said cylinders forming a chamber thereabove, a transverse partition extending between said tank and the lower depending portion of the said central cylinder and closing the bottoms of said annular compartments, louvered openings in the said central cylinder below said partition and other louvered openings in each of the cylinders above said partition providing communications between the said compartments, louvered inlet openings to said tank below the said partition, a cylindrical baffle depending from the said partition between the said inlet openings and said first named openings, drain tubes from each of the said compartments into the said tank, a gas outlet from the uppermost portion and an oil outlet from the lower portion of said tank.

3. In an oil and gas separator comprising a domed tank having a concentric arrangement of vertical cylinders in the upper end thereof forming annular compartments around a central cylinder, a closure for the upper ends of the said cylinders spaced from the dome of the said tank providing a chamber therebeneath. a horizontal partition surrounding the lower end of the central cylinder, a closure in the lower end of said central cylinder, louvered inlet openings in the said tank below the said partition, louvered openings opposingly positioned in the lower end of the said central cylinder, louvered openings providing communications between the central cylinder and each of the annular compartments above the said partition, a cylindrical baffle depending from the said partition and surrounding the lower end of the said central cylinder.

4. In combination with an oil and gas separator comprising a main domed tank having a concentrical arrangement of substantially vertical cylinders forming annular compartments in the upper portion thereof, the innermost of the said cylinders depending below the others and having its lower end closed, a top spaced from the dome of the said tank closing all of the said cylinders and providing a chamber thereabove beneath the said dome, a horizontal partition around the central cylinder closing the lower ends of the said annular compartments, a cylindrical baffle depending from the said partition and surrounding the depending portion of the said central cylinder, louvered openings in the lower end of the said central cylinder within the said baffle and louvered openings providing communications between each of the said compartments, louvered inlet openings in the said tank above the lower end of the said baffle and oil and gas outlets in the said tank.

5. In an oil and gas separator comprising a tank having a multiple of concentrically arranged vertical cylinders therein forming annular compartments, the said cylinders having their upper ends closed and spaced from the dome of the said tank, a partition arranged around the central cylinder closing the lower ends of the annular compartments providing a space around and above the outermost of the cylinders within the said tank, the said central cylinder depending below the said partition and having its lowermost end closed, a cylindrical baffle concentrically surrounding the depending portion of the said central cylinder and depending from the said partition, louvered openings in the walls of the said tank above the lower end of the said baffle, drain tubes communicating with each of the said compartments and extending downwardly into the said tank, louvered openings in the said central cylinder within the said baffle, louvered openings providing communication between the said central cylinder and the said compartments whereby the lighter constituents of the confluent entering the said tank through the said louvered openings therein are passed centripetally through said central cylinder and the said compartments and gas and oil outlets in the said tank.

EDWARD C. KOPP.